United States Patent
Maes et al.

(10) Patent No.: US 9,166,850 B2
(45) Date of Patent: Oct. 20, 2015

(54) DATA RETRANSMISSION REQUEST DEVICE, A DATA TRANSMITTER, AND A DATA RETRANSMISSION METHOD FOR MULTI-TONE SYSTEMS

(71) Applicant: Alcatel-Lucent, Paris (FR)

(72) Inventors: Jochen Maes, Veerle (BE); Dirk Vanderhaegen, Wemmel (BE); Michael Timmers, Herent (BE); Danny Van Bruyssel, Bonheiden (BE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/349,716

(22) PCT Filed: Oct. 16, 2012

(86) PCT No.: PCT/EP2012/070482
§ 371 (c)(1),
(2) Date: Apr. 4, 2014

(87) PCT Pub. No.: WO2013/060600
PCT Pub. Date: May 2, 2013

(65) Prior Publication Data
US 2014/0247900 A1    Sep. 4, 2014

(30) Foreign Application Priority Data

Oct. 25, 2011  (EP) ..................................... 11290495

(51) Int. Cl.
*H04L 27/28* (2006.01)
*H04L 27/26* (2006.01)
(Continued)

(52) U.S. Cl.
CPC .......... *H04L 27/2626* (2013.01); *H04L 1/1607* (2013.01); *H04L 1/1825* (2013.01);
(Continued)

(58) Field of Classification Search
CPC ... H04L 27/2626; H04L 5/023; H04L 1/1825; H04L 1/1864; H04L 1/1896; H04L 27/2601; H04W 52/242
USPC .................................................. 375/260, 267
See application file for complete search history.

(56) References Cited

U.S. PATENT DOCUMENTS

2005/0122898 A1    6/2005  Jang et al.
2006/0178755 A1*   8/2006  Ling et al. ......................... 700/1
(Continued)

FOREIGN PATENT DOCUMENTS

EP    1011245 A1    6/2000
JP    2006203355 A  8/2006
(Continued)

OTHER PUBLICATIONS

Zhu, Huiling : "Adaptive Resource Management Based on Unequal Error Protection in OFDM Systems", 2010 IEEE Vehicular Technology Conference (VTC 2010-Spring)—May 16-19, 2010—Taipei, Taiwan, IEEE, US, May 16, 2010, pp. 1-5.
(Continued)

*Primary Examiner* — Don N Vo
(74) *Attorney, Agent, or Firm* — Harness, Dickey & Pierce, P.L.C.

(57) ABSTRACT

In a multi-tone data transmission system, data are modulated on a set of M tones for being transmitted between a transmitter and a receiver. The data retransmission request device in such system is adapted to request retransmission of a data transmission unit that is hierarchically modulated at a particular hierarchical level and that is modulated on a particular group of N tones, N being a positive integer value greater than one and smaller than or equal to M.

9 Claims, 2 Drawing Sheets

(51) Int. Cl.
  *H04L 1/16* (2006.01)
  *H04L 1/18* (2006.01)
  *H04L 27/18* (2006.01)
  *H04L 27/34* (2006.01)

(52) U.S. Cl.
  CPC ............ *H04L1/1864* (2013.01); *H04L 1/1893* (2013.01); *H04L 1/1896* (2013.01); *H04L 27/183* (2013.01); *H04L 27/3488* (2013.01)

(56) References Cited

U.S. PATENT DOCUMENTS

2007/0270170 A1* 11/2007 Yoon et al. .................... 455/509
2009/0042511 A1* 2/2009 Malladi ............................ 455/62
2011/0274148 A1* 11/2011 Urban et al. .................. 375/222

FOREIGN PATENT DOCUMENTS

| | | |
|---|---|---|
| JP | 2006303698 A | 11/2006 |
| KR | 1020010023712 A | 3/2001 |
| KR | 1020100012897 A | 2/2010 |
| WO | WO-2008/025510 A1 | 3/2008 |

OTHER PUBLICATIONS

Zheng, Haitao et al: "Multimedia Services over Digital Subscriber Lines", IEEE Signal Processing Magazine, IEEE Service Center, Piscataway, NJ, US, vol. 17, No. 4, Jul. 1, 2000, pp. 44-60.
International Search Report PCT/ISA/210 for International Application No. PCT/EP2012/070482 Dated Nov. 13, 2012.

* cited by examiner

DATA RETRANSMISSION REQUEST DEVICE, A DATA TRANSMITTER, AND A DATA RETRANSMISSION METHOD FOR MULTI-TONE SYSTEMS

This application is the national phase under 35 U.S.C. §371 of PCT International Application No. PCT/EP2012/070482 which has an International filing date of Oct. 16, 2012, which claims priority to European patent application number EP 11290495.8 filed Oct. 25, 2011; the entire contents of each of which are hereby encorporated by reference.

FIELD OF THE INVENTION

The present invention generally relates to protection of multi-tone data transmission systems like for instance a Discrete Multi-Tone (DMT) based Digital Subscriber Line (DSL) system against time-varying noise, e.g. resulting from a new starting line or impulse noise induced by electrical appliances in the vicinity of the line. The invention in particular concerns intelligent retransmission of erroneously received data transmission units (DTUs) in order to optimize throughput and stability of the connection in the presence of time-varying noise.

BACKGROUND OF THE INVENTION

It is well-known to tackle time-varying noise in multi-tone data transmission systems, i.e. transmission systems wherein data bits are modulated on plural tones or carriers to be conveyed between a transmitter and receiver, through various online reconfiguration mechanisms. These online reconfiguration mechanisms for instance include bitswap, Seamless Rate Adaptation (SRA) and Save Our Showtime (SOS) mechanisms.

A bitswap mechanism moves bits from tones with increasing noise to other tones without impact on the overall bitrate between transmitter and receiver.

Seamless Rate Adaptation adjusts the overall bit rate between transmitter and receiver downwards or upwards depending on the noise margin variation. In addition, the bitloading of the tones is adjusted in function of the changed overall bit rate.

Save Our Showtime is applied in case of a strong noise increase at a point in time where the noise margin of the multi-tone system is negative. Since it is impossible to accurately determine how many bits each carrier can convey, the bitloading is drastically decreased to avoid resynchronization or re-initialization of the multi-tone system. SOS is usually followed by SRA for upwards adaptation of the overall bit rate.

The above described online reconfiguration mechanisms are disadvantageous in various aspects. Online reconfiguration must first be negotiated between transmitter and receiver through a signalling protocol. Also the timing of online reconfiguration must be synchronised between transmitter and receiver. This may for instance be realised through a flag on the SYNC symbol on DMT based DSL systems. As a consequence, online reconfiguration is rather slow. In 4 kHz DMT based DSL systems, i.e. DSL systems that use a set of 4 kHz spaced apart carriers, the expected update time for online reconfiguration mechanisms is not below 128 DMT symbols or 32 milliseconds. As a result, transmission errors within the first 32 milliseconds after a noise transient must be corrected through mechanisms different from online reconfiguration. For SRA in VDSL, generation of the EOC or Embedded Operations Channel message, transmission of the EOC message, interpretation of the EOC message, and waiting for the SYNC symbol may involve a total reaction time of up to 400 milliseconds. When repeated partially for every group of 128 carriers saved through SOS, the online reconfiguration from transient to full-band execution may even occupy up to 1 second.

A fast way to correct transmission errors consists in retransmission of the erroneously received data transmission units. Thereto, the transmitter is equipped with a retransmission buffer that stores recently transmitted data transmission units. Upon receipt of an erroneous data transmission unit, the receiver requests retransmission through an Automatic Repeat request (ARQ). Upon receipt of the ARQ, the transmitter sends the stored copy of the data transmission unit to the receiver.

Although a retransmission scheme can be used to deal with noise transients in multi-tone data transmission systems up to the point in time where the bitloading has been adjusted through online reconfiguration mechanisms, retransmission is limited in capacity and introduces substantial overhead. Due to memory cost constraints and standardization requirements, the retransmission buffer typically stores about 10 milliseconds of transmitted data. In case of a strong noise transient, this may be insufficient to correct all transmission errors within the time interval required for online reconfiguration. As a result, traditional retransmission in combination with online reconfiguration may be unable to avoid line instabilities such as resynchronizations or re-initializations. Further, traditional retransmission of multi-tone symbols inherently impacts the instantaneous throughput of the line dramatically since the retransmitted data symbols occupy all or nearly all remaining bandwidth in case of a strong noise transient.

European Patent Application EP 1 011 245 entitled "Transmitter and Receiver and Data Transmission Method" describes hierarchical data modulation and data demodulation in single carrier communication systems (QPSK, BPSK, 16QAM based). In order to improve transmission efficiency, the receiver performs hierarchical demodulation, i.e. data transmission units named cells in EP 1 011 245 are demodulated from particular hierarchical noise levels. Thereafter, the receiver performs error detection and requests retransmission of an erroneous cell demodulated from a particular hierarchical level. The transmission efficiency is increased since the amount of data that must be retransmitted is reduced.

Although FIG. 10 of EP 1 011 245 and embodiment 4 described in paragraphs [0077]-[0081] of EP 1 011 245 disclose a multi-carrier system, each hierarchical modulation layer, e.g. hierarchy 1, hierarchy 2, or hierarchy 3, is tied to a distinct carrier, e.g. sub-carrier A, sub-carrier B or sub-carrier C. As a result, each cell or data transmission unit is still conveyed over a single, distinct carrier. A data cell in other words is assigned to a particular hierarchical level and as a result thereof also to a particular carrier. For this reason, EP 1 011 245 does not guarantee a stable line with optimized instantaneous throughput for multi-carrier systems in case of strong noise increases.

It is an objective of the present invention to disclose a system and method that improves the stability and instantaneous throughput of multi-tone data transmission under time varying noise. More particularly, it is an objective of the present invention to disclose an improved data retransmission request device, a data transmitter and a data retransmission method for use in multi-tone data transmission systems that resolve the above mentioned drawbacks of existing solutions.

SUMMARY OF THE INVENTION

According to the present inventions, the above mentioned shortcomings of existing time-varying noise cancelling mechanisms are resolved by the data retransmission request device for use in a multi-tone data transmission system wherein data are modulated on a set of M tones for being transmitted between a transmitter and a receiver, as defined by claim 1, the data retransmission request device being adapted to request to the transmitter retransmission of a data transmission unit that is hierarchically modulated at a particular hierarchical level and that is modulated on a particular group (G2) of N tones, N being a positive integer value greater than one and smaller than or equal to M.

The retransmission according to the present invention will be able to deal with significant noise transients without having to retransmit all data contained in one or more multi-tone symbols, e.g. DMT symbols.

The current invention takes benefit of the hierarchical modulation and multi-carrier modulation by requesting the data transmitter to retransmit only data modulated on a particular group of affected carriers at a particular hierarchical level in the modulation scheme. It is noticed that in case N=M, all tones form part of one group of tones. Also in this particular situation where the tones are not subdivided in smaller subgroups of tones, the data retransmission request device according to the present invention remains advantageous as it keeps taking benefit of the hierarchical modulation scheme. Only data that form part of data transmission units at an affected hierarchical layer (and eventual lower layers that contain more error sensitive data) are requested to be retransmitted. Data at non affected hierarchical layers are not retransmitted.

The overall number of retransmission requests will decrease thanks to the current invention, and the amount of data to be retransmitted per retransmission request will be smaller. As a direct result thereof, the chances that data are not yet received correctly after 10 milliseconds decrease. The reliability of the multi-tone transmission system in situations of strong time-varying noise consequently increases. In addition, the instantaneous throughput in the presence of strong noise transients increases since the present invention reduces the overall amount of data retransmitted to correct errors significantly in comparison with traditional retransmission systems wherein lengthy DTUs that are mapped onto symbols uncorrelated with the modulation scheme are retransmitted, even if only a few bits thereof, modulated on affected tones or with constellations that are more error-sensitive, are erroneously received. Thanks to the increased throughput, the multi-tone transmission system may stay synchronized during strong noise transients.

In addition to a data retransmission request device according to claim 1, the present invention also relates to a corresponding data transmitter for use in a multi-tone data transmission system wherein data are modulated on a set of M tones for being transmitted between the data transmitter and a receiver, the transmitter being defined by claim 8, comprising:

a retransmission buffer adapted to temporarily memorize transmitted data transmission units;

a retransmission request receiving module adapted to receive and interpret a request for retransmission of a data transmission unit that is hierarchically modulated at a particular hierarchical level and that is modulated on a particular group (G2) of N tones, N being a positive integer value greater than one and smaller than or equal to M; and a retransmission module adapted to retransmit the data transmission unit.

Further, the present invention relates to a corresponding data retransmission method in a multi-tone data transmission system wherein data are modulated on a set of M tones and transmitted between a transmitter and a receiver, the method being defined by claim 9 and comprising:

temporarily memorizing transmitted data transmission units in the transmitter;

requesting to the transmitter retransmission of a data transmission unit that is hierarchically modulated at a particular hierarchical level and that is modulated on a particular group (G2) of N tones, N being a positive integer value greater than one and smaller than or equal to M; and retransmitting the data transmission unit.

Optionally, as defined by claim 2, each group of N tones may comprise a group of N successive tones out of said M tones ranked according to their bit loading capacity.

Indeed, although this is not necessary to implement the present invention, tones having a similar bit loading capacity are preferably grouped together. The bit loading capacity of the tones is typically determined by measuring the Signal-to-Noise Ratio or SNR of the tones during initialization. By grouping tones with a comparable bit loading capacity or SNR in a group of tones, the tones of the group can convey the same amount of bits. The hierarchical modulation scheme consequently may modulate the same amount of bits on each tone within a group.

Further optionally, as defined by claim 3, the data transmission unit comprises data, a cyclic redundancy check, and a unique identification of the data transmission unit, and the data retransmission request device is adapted to request retransmission of the data transmission unit when the cyclic redundancy check indicates that the data transmission unit is received erroneously.

Thus, each DTU may contain data, a CRC and a unique identifier. Upon receipt, the DTU is mapped to a hierarchical layer within the tone group whereon it is modulated. After demodulation, the CRC is used to verify correct receipt of the DTU. If the CRC indicates that the received and demodulated DTU is erroneous, the data retransmission request device according to the current invention will request retransmission of the DTU. The data retransmission request device thereto sends a retransmission request towards the transmitter.

Alternatively, as defined by claim 4, the data transmission unit comprises data, a forward error correction code, and a unique identification of the data transmission unit, and the data retransmission request device is adapted to request retransmission of the data transmission unit when the forward error correction code fails to restore the data transmission unit.

Thus, each DTU may contain data, a FEC code and a unique identifier. The FEC code may be a mild forward error correction code able for instance to correct up to 2 bit errors per DTU. Upon receipt, the DTU is mapped to a hierarchical layer within the tone group whereon it is modulated. After demodulation, the FEC is used to correct eventual errors in the demodulated DTU. If the FEC cannot correct all errors in the received and demodulated DTU, the data retransmission request device according to the current invention will request retransmission of the DTU. The data retransmission request device thereto sends a retransmission request towards the transmitter.

In the above described embodiments wherein the DTU contains a unique identifier, the data retransmission request device may further be adapted to generate a retransmission request containing the unique identification of the data transmission unit. This optional aspect of the present invention is defined by claim 5.

Indeed, to request retransmission of the DTU, the data retransmission request device may send a retransmission request containing the unique identifier of the DTU towards the transmitter. The transmitter is knowledgeable on the unique identifiers since it has generated and transmitted the DTUs each containing their unique identifier, and it has stored the transmitted DTUs in its retransmission buffer.

Alternatively, as defined by claim 6, the data retransmission request device according to the current invention may be adapted to generate a retransmission request containing an identification of the particular group of N tones, an identification of the particular hierarchical level, and a symbol identification.

Thus, instead of identifying the DTU to be retransmitted through its unique identifier, the DTU may be identified through the tone group whereon it is modulated, the hierarchical level whereat it is modulated, and a symbol identification.

Optionally, as defined by claim 7, the data transmission unit comprises b×N bits, b being a positive integer number of bits that is modulated at each hierarchical level on each tone within the group of N tones.

Hence, the tones are grouped in tone groups of N tones. each hierarchical layer of a tone group may comprise b×N bits. If a transient noise hits the layer of a tone group, only the block of b×N bits that is damaged needs to be retransmitted.

According to an advantageous aspect, the hierarchical modulation is adapted to modulate the most error sensitive bits on the lowest hierarchical level, and to gradually modulate less error sensitive bits on higher hierarchical levels, and the data retransmission request device is adapted to automatically request retransmission of all data transmission units modulated on the particular group of N tones at hierarchical levels lower than the particular hierarchical level.

Thanks to such hierarchical modulation wherein the most error sensitive bits are modulated on the lowest layers and the least error sensitive bits are modulated on the highest layers, the error probability on the highest layers will remain sufficiently low, even in case of significant noise transients. These higher layers hence can be used to keep the connection operational. Further, when a DTU at a particular hierarchical layer is received erroneously, chances are high that also the DTUs modulated at lower hierarchical layers on the same tones are affected. The data retransmission request device according to the current invention may take advantage thereof. A retransmission request for a DTU, modulated at a particular layer on a particular tone group, may consequently serve as a retransmission request for all DTUs modulated on the same tone group at lower layers in the modulation hierarchy. This further enhances the efficiency of the retransmission according to the current invention in comparison with traditional retransmission mechanisms.

The data transmitter according to the present invention may further comprise:
  a modulation module adapted to de-activate a number of lowest hierarchical levels based on a number or rate of received retransmission requests.

This way, the error probability is further decreased by stopping the mapping of DTUs to the lowest hierarchical levels temporarily or permanently. The deactivation is controlled by the transmitter and based on information available to its retransmission engine, e.g. the number of received retransmission requests or the rate of received retransmission requests.

The retransmission module in the transmitter according to the present invention may further be adapted to retransmit a data transmission unit at a highest available hierarchical level.

This way, the error probability on retransmission is further reduced.

The current invention also relates to a corresponding data transmitter, wherein the retransmission module is adapted to automatically retransmit all data transmission units modulated on the particular group of N tones at hierarchical levels lower than the particular hierarchical level.

Thus, when receiving a retransmission request for a DTU modulated on a particular tone group at a particular hierarchical level, an embodiment of the transmitter according to the present invention may automatically retransmit the requested DTU and all DTUs modulated on the same tone group at lower layers.

The present invention also relates to a corresponding data retransmission method, further comprising:
  automatically retransmitting all data transmission units modulated on the particular group of N tones at hierarchical levels lower than the particular hierarchical level.

The error sensitivity of a bit may optionally be determined in proportion to a distance to a constellation point that corresponds to a variation of the bit.

Indeed, if the distance to the constellation point that corresponds to a change of the bit under consideration is small, the chance that the bit will erroneously arrive at the receiver is high. Such bits in other words preferably are modulated on the lowest hierarchy layers since they are more sensitive to noise transients and consequently most likely will have to be retransmitted in case the tone group, i.e. the carrier frequencies, whereon they are modulated are affected by noise.

DETAILED DESCRIPTION OF EMBODIMENT(S)

Figure 1:
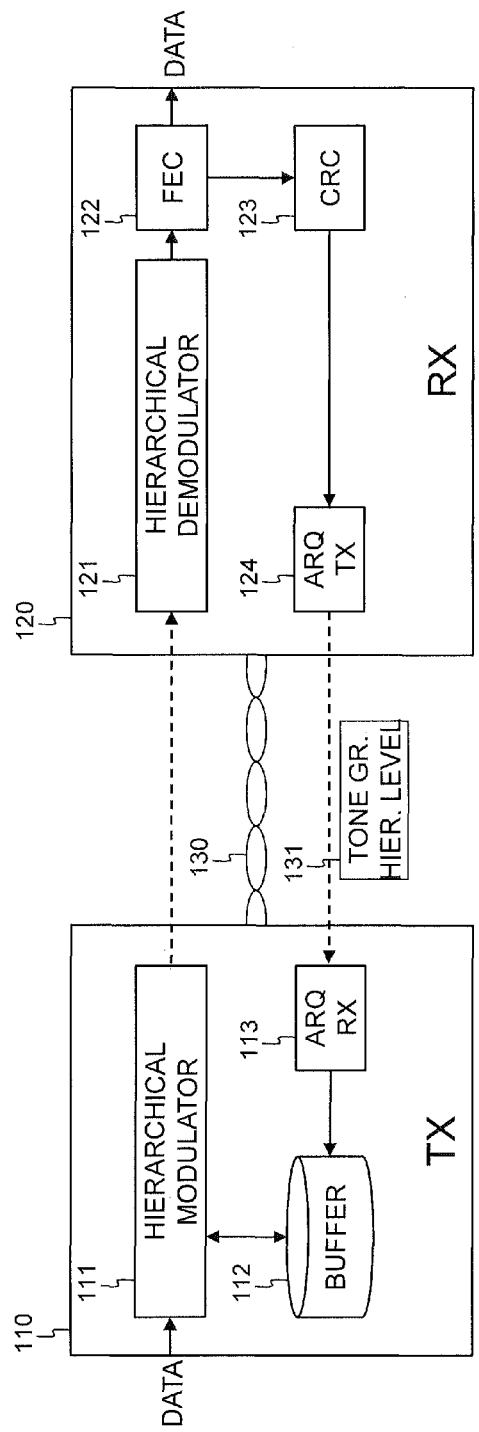
FIG. 1 represents a functional block scheme of a multi-tone transmission system including an embodiment of the data retransmission request device 124 according to the present invention and an embodiment of the data transmitter 110 according to the current invention.

FIG. 1 shows a multi-tone transmitter, TX or 110, connected over a twisted pair line 130 to a multi-tone receiver, RX or 120. The transmitter 110 and receiver 120 typically form part of transceivers not drawn in FIG. 1. For instance, TX 110 may form part of a central office DSL transceiver and RX 120 may form part of a customer premises equipment DSL transceiver in case the downstream direction of a DSL connection is considered. Reversely, TX 110 may form part of a customer premises equipment DSL transceiver and RX 120 may form part of a central office DSL transceiver in case the upstream direction of a DSL connection is considered.

The transmitter 110 contains a hierarchical modulator 111 that modulates data bits DATA on a set of tones or carriers for being transmitted over the line 130. Such hierarchical data modulation is described in more detail in the counterpart patent application of the same applicant entitled "Hierarchical and Adaptive Multi-Carrier Digital Modulation and Demodulation", incorporated herein by reference. The data bits are subdivided in data transmission units or DTUs that are hierarchically modulated on the tones: each DTU is assigned to a particular group of tones and a particular hierarchical level, as will be explained in the following paragraphs. The transmitter 110 in addition contains a retransmission buffer 112 wherein the most recently transmitted DTUs are temporarily memorized in order to enable retransmission thereof should a DTU arrive erroneously at the receiver RX. The retransmission buffer 112 may for instance have a length that is slightly longer than a single retransmission cycle. The retransmission buffer 112 operates on instruction of the automated retransmission request receiver 113 or ARQ RX. ARQ RX receives and interprets the retransmission requests received from receiver RX and instructs the retransmission buffer 112 and/or the hierarchical modulator 111 to retransmit the DTU that was erroneously received by RX. This DTU will be identified through its unique ID, as will be explained below, or through the tone group and hierarchical level whereon it is modulated. If the DTU is no longer available in the retransmission buffer 112, it will be impossible to retransmit the DTU.

The receiver 120 contains a hierarchical demodulator 121 that demodulates the DTUs from the tones. In the embodiment illustrated by FIG. 1, each DTU is assumed to contain a mild forward error correction or FEC code. This FEC code is used by the FEC module 122 to correct for instance up to 2 bits per received DTU. The FEC code (or eventually an additional CRC code) is used by CRC module 123 to verify if the DTU is erroneous. If the DTU is erroneous, CRC module 123 shall instruct the automated retransmission request transmit module ARQ TX 124 to generate and transmit a retransmission request 131 for the erroneous DTU. This retransmission request 131 shall identify the DTU through its unique identifier, as will be explained below, or through the combination of the tone group and hierarchical level from which it was demodulated. For DTUs that are correctly received according to the CRC module 123, no retransmission is requested. Alternatively, a negative acknowledgement may be sent, meaning that the receiver requests to not retransmit the DTU in this case. These DTUs correspond to DATA in FIG. 1.

In the embodiment illustrated by FIG. 1, the hierarchical modulator 111 applies a hierarchical modulation scheme wherein b=2 data bits are modulated at each hierarchical layer on each tone. These hierarchical layers are denoted L1, L2 and L3 along axis 202 in FIG. 2. The hierarchical modulator 111 assigns the data bits that are most error sensitive to the lowest hierarchical layer(s) and data bits that are less error sensitive to the higher hierarchical layer(s). The most error sensitive bits are for instance those bits whose alteration leads to reception of a constellation point that is close in distance in the constellation diagram to the constellation point received for the non-altered bit. By design, the uncoded bit error ratio hence will be higher in lower layers in comparison to higher layers.

For the hierarchical modulation, the tones are grouped into tone groups of N tones, where N can vary between tone groups. These tone groups are denoted G1, G2, G3, G4 and G6 in FIG. 2. In order to group the tones, the transmitter TX and receiver RX measure the SNR of each tone during initialization and determine the bit load capacity of each tone. The tones are then ordered according to decreasing bit load capacity on axis 201 and groups of N tones are established, the N tones forming part of a single group having comparable properties in bit load capacities. This may include grouping the tones according to SNR. This may also include grouping the tones according to properties of the constellation order that can be sustained. Indeed, it may be beneficial to group tones of constellation order $2^{2d}$ and group tones of constellation order $2^{2d+1}$, where d is a positive integer. The benefit of placing tones with certain odd bit loading capacity in a dedicated group will be explained in more detail below.

Figure 2:
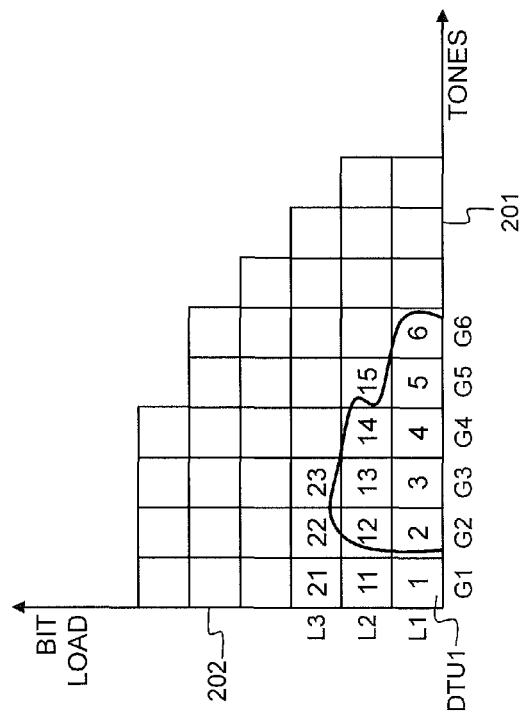
FIG. 2 illustrates hierarchical modulation as applied by the hierarchical modulator 111 that forms part of the data transmitter 110 according to the present invention drawn in FIG. 1.

The DTU size of the modulation and retransmission scheme illustrated by FIG. 1 and FIG. 2 is adapted to match the number of bits in a layer of a tone group: $S_{DTU}=b\times N$. These b×N bits of each DTU include data bits, cyclic redundancy check or CRC bits, and a DTU identification number or sequence number. The sequence number of DTU1 for instance is 1, as shown in FIG. 2. As can be seen from FIG. 2, the DTUs with sequence numbers 1, 2, 3, 4, 5, and 6 are modulated at the lowest hierarchical layer L1 on respective tone groups G1, G2, G3, G4 and G5. The DTUs with sequence numbers 11, 12, 13, 14 and 15 are modulated at the second hierarchical layer L2 on respective tone groups G1, G2, G3, G4 and G5. The DTUs with sequence number 21, 22 and 23 are modulated at the third hierarchical layer L3 on respective tone groups G1, G2 and G3.

Alternatively, the DTU size might not be adapted to match the number of bits in a layer on a tone group. In case the DTU size is smaller, multiple DTUs may be mapped to the layer or to the layer within the tone group. In case the DTU size is larger, a fraction of the DTU is mapped to the layer or to the layer within the tone group. The remaining bits are modulated at the same hierarchical layer on a different tone group of the same data symbol, or at the same hierarchical layer and tone group of a next data symbol. The advantage of this alternative implementation is that the bit loading of the tone group or individual carriers may be adapted without a need to adapt the DTU size.

Each DTU in the transmission queue is mapped to a hierarchical layer within a tone group. After demodulation by the demodulator 121, a FEC is performed and a cyclic redundancy check is performed on the FEC/CRC bits that form part of each DTU. In case of an erroneous DTU, e.g. as a result of transient noise that hits the layer of a tone group, the receiver RX will only request retransmission of the erroneous DTU. In FIG. 2, it is for instance assumed that the DTUs with sequence numbers 2-6, 12-15 and 22-23 arrive erroneously at the receiver 120. According to the present invention, ARQ TX 124 shall identify the layer HIER. LEVEL and tone group TONE GR. of these erroneously received DTUs in one or more retransmission request message 131. Alternatively, ARQ TX 124 may identify the erroneous DTUs through their sequence numbers when requesting retransmission thereof.

Thanks to the hierarchical modulation, designed as explained here above to modulate more error sensitive bits on lower hierarchical levels, it suffices to identify in the retransmission request 131 for each tone group the highest layer that was erroneously received, e.g. L3 for G2, L3 for G3, L2 for G4, L2 for G5 and L1 for G6. The retransmission request receiver 113 may then be configured to automatically instruct retransmission of all DTUs modulated at lower hierarchical layers on those tone groups since the probability that the lower layers will also be in error on those tones is significant. Such implementation further enhances the efficiency of the retransmission for multi-tone systems with hierarchical modulation according to the current invention.

Figure 3:
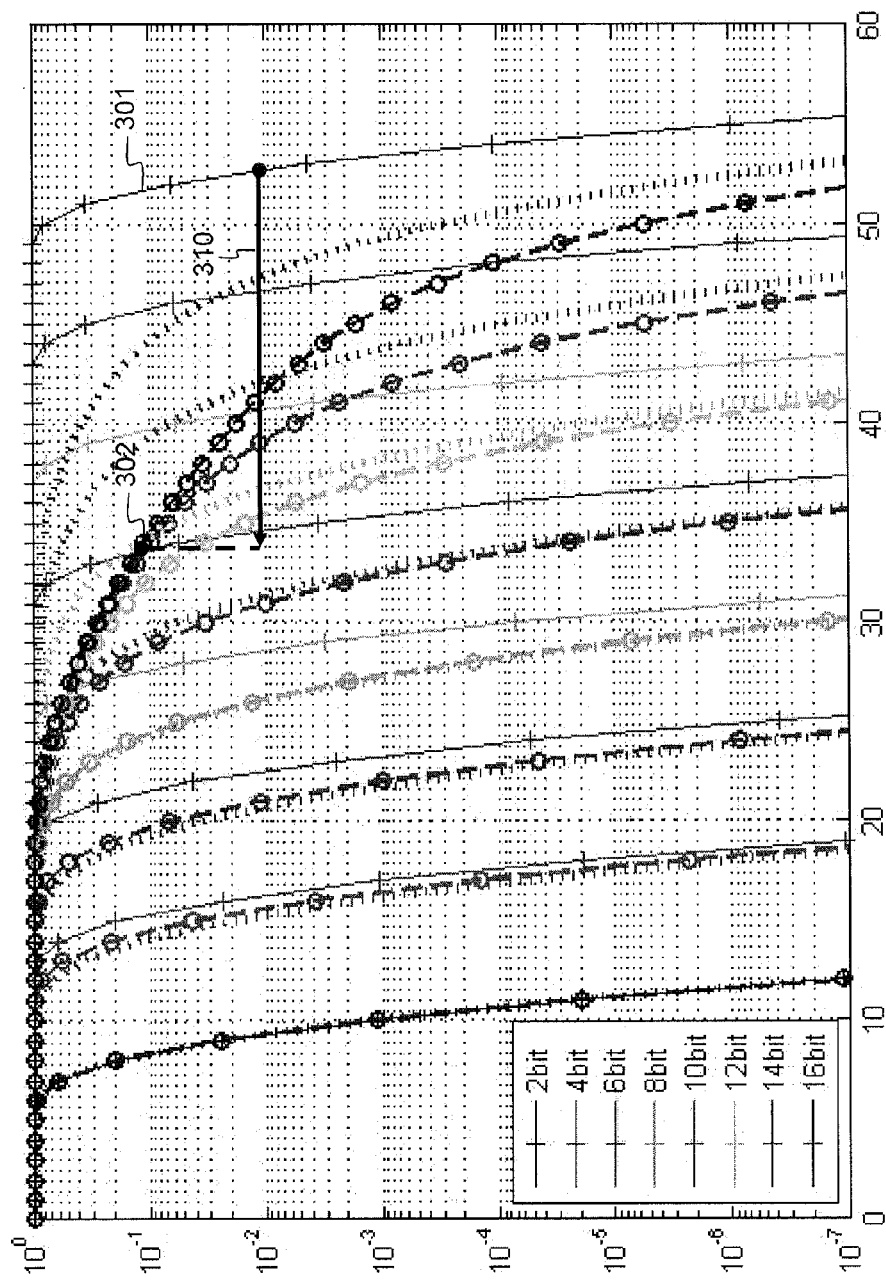
FIG. 3 shows the error probability for DTUs of 64 bytes for lowest and highest power hierarchical constellations and for normal constellations in the multi-tone transmission system of FIG. 1.

In comparison, in a multi-tone transmission system with traditional retransmission that operates on DTUs that are assembled without taking into account the modulation scheme, all DTUs may get erroneous in case a noise transient affects a few tones. In a system and method according to the current invention, the error probability on the higher layers will remain sufficiently low thanks to the hierarchical modulation, even in case of significant noise transients, e.g. up to 20 dB, to keep the line operational. This is illustrated by FIG. 3. Therein, it is assumed that each DTU comprises b×N=512 bits, and each DTU has a FEC error correction capability of 2 bits. FIG. 3 shows the change in DTU error ratio at the different hierarchical levels as a function of noise. When operating at a 16-bit constellation, corresponding to a DTU error ratio of $10^{-7}$ for the overall constellation at 53 dB signal-to-noise ratio (dotted line in FIG. 3), a noise transient 310 of 20 dB would cause erroneous reception of DTUs modulated on the lower layers like 301—the DTU error ratio for those layers becomes close to 1 at 55−20=33 dB signal-to-noise ratio (full line with "+" markers in FIG. 3)—but the highest layers like 302 will remain operational on a DTU error ratio of $10^{-1}$ (dashed line with "o" markers in FIG. 3). Thanks to the retransmission according to the present invention, the line will remain active during the noise transient and the line will be able to adapt the bit loading to adjust to the new line conditions.

In addition, to further decrease the error probability, the transmitter can decide to de-activate the lowest hierarchical layers by stopping the mapping of DTUs to the lowest layers. This de-activation is controlled by the transmitter and based on information available to the retransmission engine, such as the number or rate of received retransmission requests. This measure will decrease the error probability of the remaining layers. The transmitter can decide to stop mapping DTUs on the lowest hierarchical layers temporarily to increase the probability of successful transmissions, or it can permanently stop mapping DTUs to the lowest hierarchical layers to mitigate the increase of error probability resulting from a permanent noise increase. In the latter case, the line will observe a higher number of retransmissions for a duration slightly larger than the ARQ round trip time. Thereafter, the transmitter has acquired sufficient knowledge to decide shutting of the higher layers. When the noise increase is temporary, the transmitter may re-activate the lowest layers upon receiving an indication of the ending of the temporary noise increase. The activation and deactivation of the lower hierarchical layers can be performed by the transmitter without explicit coordination with the receiver, as described in the counterpart patent application of the same applicant entitled "Hierarchical and Adaptive Multi-Carrier Digital Modulation and Demodulation", incorporated herein by reference.

De-activation of the lowest hierarchical layers is cumbersome for constellations with odd bit loading capacity when these constellations are not represented through a rectangular constellation grid. Indeed, such constellations are typically re-shaped to a cross-shaped grid to reduce average transmit power of the constellation. Due to this, deactivation of the lowest hierarchical layers may require the transmitter to omit the re-shaping operation. Constellations where this effect would occur can be grouped together and their layer structure adapted. For instance, where for constellations with even bit load capacity each layer may contain 2 bits per tone, the lowest layer of the constellations with odd bit loading and where an omission of the re-shaping operation would be required, may contain 3 bits per tone: 2 in the in-phase component and one in the quadrature component.

The retransmission in accordance with the principles of the current invention will ensure that the instantaneous throughput will scale with the optimum throughput. The retransmission will remain doing so until the bit loading has been adjusted through the slow control procedure of online reconfiguration commands inherent to bitswap, seamless rate adaptation or save our showtime. As such, the retransmission according to the current invention allows the line to remain stable and operate at highest possible throughput, even when the noise variations are fast in comparison with the online reconfiguration mechanism.

It is further noticed that in order to ensure a low delay and a low number of retransmissions of the same DTU, the retransmission advantageously occurs at the highest layer available. This way, the error probability for the retransmitted DTU is minimized.

It is also noticed that although b×N is fixed in the above described embodiment, alternative implementations wherein b×N, i.e. the number of bits that form a DTU to be modulated on a particular group of tones at a particular hierarchical layer, is variable can be thought of.

Furthermore, it is remarked that although the above described embodiment is implemented with the same amount N of tones per group, the current invention is applicable with the same advantages in an alternative scenario where the different groups have different amounts of tones, e.g. N1 tones in group G1, N2 tones in group G2, etc.

Another remark is that although the invention has been described for DSL and data transmission over fixed lines, it will be understood by the skilled person that applicability of the current invention is not limited thereto. Any multi-tone transmission system using wireline or wireless connections that are susceptible to time varying noise may be improved in terms of stability and instantaneous throughput through the retransmission technique according to the present invention.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. It is to be understood that the terms so used are interchangeable under appropriate circumstances and embodiments of the invention are capable of operating according to the present invention in other sequences, or in orientations different from the one(s) described or illustrated above.

The invention claimed is:

1. A data retransmission request device for use in a multi-tone data transmission system wherein data are modulated on a set of M tones for being transmitted between a transmitter and a receiver, wherein said data retransmission request device is adapted to request to said transmitter retransmission of a data transmission unit that is hierarchically modulated at a particular hierarchical level and that is modulated on a particular group of N tones, N being a positive integer value greater than one and smaller than or equal to M.

2. A data retransmission request device according to claim 1, wherein said group of N tones comprises a group of N successive tones out of said M tones ranked according to their bit loading capacity.

3. A data retransmission request device according to claim 1, wherein said data transmission unit comprises data, a cyclic redundancy check, and a unique identification of said data transmission unit, and wherein said data retransmission request device is adapted to request retransmission of said data transmission unit when said cyclic redundancy check indicates that said data transmission unit is received erroneously.

4. A data retransmission request device according to claim 3, further adapted to generate a retransmission request containing said unique identification of said data transmission unit.

5. A data retransmission request device according to claim 1, wherein said data transmission unit comprises data, a forward error correction code, and a unique identification of said data transmission unit, and wherein said data retransmission request device is adapted to request retransmission of said data transmission unit when said forward error correction code fails to restore said data transmission unit.

6. A data retransmission request device according to claim 1, further adapted to generate a retransmission request containing an identification of said particular group of N tones, an identification of said particular hierarchical level, and a multi-tone data symbol identification.

7. A data retransmission request device according to claim 1, wherein said data transmission unit comprises b×N bits, b being a positive integer number of bits that is modulated at each hierarchical level on each tone within said group of N tones.

8. A data transmitter for use in a multi-tone data transmission system wherein data are modulated on a set of M tones for being transmitted between said data transmitter and a receiver,
wherein said data transmitter comprises:
a retransmission buffer adapted to temporarily memorize transmitted data transmission units;
a retransmission request receiving module adapted to receive and interpret a request for retransmission of a data transmission unit that is hierarchically modulated at a particular hierarchical level and that is modulated on a particular group of N tones, N being a positive integer value greater than one and smaller than or equal to M; and
a retransmission module adapted to retransmit said data transmission unit.

9. A data retransmission method in a multi-tone data transmission system wherein data are modulated on a set of M tones and transmitted between a transmitter and a receiver,
wherein said data retransmission method comprises:
temporarily memorizing transmitted data transmission units in said transmitter;
requesting to said transmitter retransmission of a data transmission unit that is hierarchically modulated at a particular hierarchical level and that is modulated on a particular group of N tones, N being a positive integer value greater than one and smaller than or equal to M; and
retransmitting said data transmission unit.

* * * * *